A. C. DAM.
DEMOUNTABLE RIM.
APPLICATION FILED JAN. 29, 1921.

1,408,172.  Patented Feb. 28, 1922.

Witness.
H. B. Davis.

Inventor.
Andrew C. Dam
by Ayer & Harriman
Atty.

UNITED STATES PATENT OFFICE.

ANDREW C. DAM, OF NEW YORK, N. Y.

DEMOUNTABLE RIM.

1,408,172.  Specification of Letters Patent. Patented Feb. 28, 1922.

Application filed January 29, 1921. Serial No. 441,037.

*To all whom it may concern:*

Be it known that I, ANDREW C. DAM, a citizen of the United States, residing at New York, in the county of New York and State of New York, have invented certain new and useful Improvements in Demountable Rims, of which the following is a specification.

This invention relates to demountable holding-means for pneumatic tires, and has for its object the provision of an improved form of demountable rim and an improved form of fixed rim arranged on the felly of the wheel, said rims being adapted for cooperative assembly, and having associated with them locking means, whereby the demountable rim may be easily and quickly removed, and replaced, and securely fastened in cooperative relation with the fixed rim.

Fig. 6 is a fragmentary detail of a portion of the expansible locking-ring to be referred to.

Figure 1:
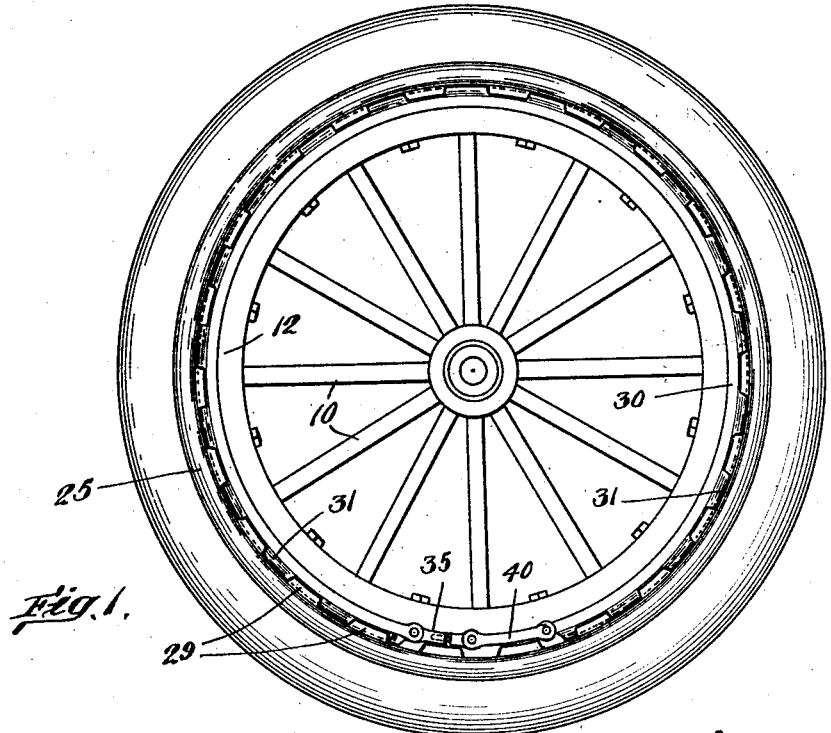
Fig. 1 is a side elevation of a wheel having demountable holding-means for a tire embodying this invention.

The wheel comprising the spokes 10 and felly 12, are, or may be, of any usual or suitable construction so far as my invention is concerned. On the periphery of the felly 12 there is arranged the fixed rim 15, which is bolted or otherwise rigidly secured thereto. This fixed rim is made of a width corresponding to the width of the felly, or thereabout. It has arranged on one of its edge-portions, projections 17, 17, with a space therebetween to form a recess, yet it may be otherwise formed. It has its outer face beveled along one edge, here shown as that edge having the projections 17, for a short distance inward from its edge, as at 19, and said beveled portion extends entirely around the outer surface of the rim. It also has on its outer face, at or near the edge opposite the bevel portion, a plurality or series of projections 20, which extend outward, preferably radially, and are equally spaced apart.

The demountable rim is adapted for sliding engagement with the fixed rim and to be locked in place thereon, and will now be described:—25 represents the demountable rim, it being made wider than the fixed rim, and having its edge-portions extended outwardly and curved or otherwise formed for engagement with the shoe or tire. Said rim 25 has on its under side, near one edge and extended entirely around it, a bevel-faced rib 26, adapted for engagement with the bevel-faced portion 19 of the fixed rim, to center or align the rims; and also has a flange 28, which is extended inwardly toward the axle of the wheel and entirely around the rim with the exception hereafter noted, which serves as a stop to prevent relative lateral movement of the rim in a direction toward the right, Fig. 2, and to avoid any wedging action of the rib 26, and said flange is or may be recessed at one or more places to receive the lugs 17, thereby to localize the demountable rim with respect to the fixed rim, and to hold the same against relative rotative movement. Said demountable rim also has on its under side, near its other edge-portion, a plurality of lugs 29, which are extended inward toward the axis of the wheel, and which are adapted to pass through the recesses between the projections 20, on the fixed rim, when said demountable rim is slid into position thereon, in which position said lugs 29 will occupy positions just beyond the corresponding edge of the fixed rim so as to provide a recess or space back of them and above the edge of the fixed rim.

The lugs 29 are beveled on their back sides, so that the recess or space provided in the rear thereof is wedge shaped. When the demountable rim is slid into position on the fixed rim one of its edge-portions will rest on the projections 20, and the beveled faced rib 26 will engage the beveled portion of the fixed rim.

Figure 2:
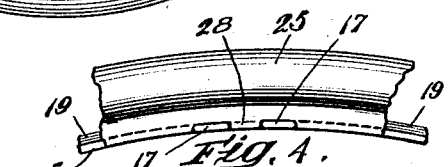
Fig. 2 is an enlarged transverse section of the felly and demountable holding-means arranged thereon, the parts being in assembled position.
Figure 3:
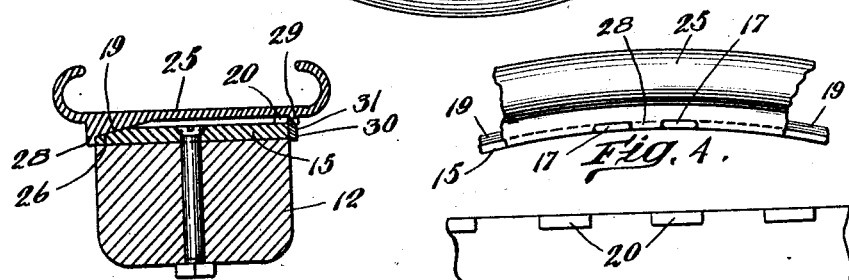
Fig. 3 is a similar view, the demountable rim being moved laterally with respect to the fixed rim.
Figure 4:
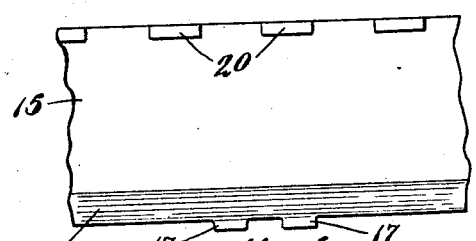
Fig. 4 is a fragmentary detail of a portion of the rims.
Figure 5:
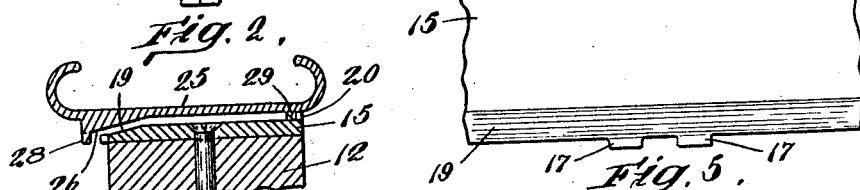
Fig. 5 is a fragmentary detail in plan view of the fixed rim.
Figure 6:
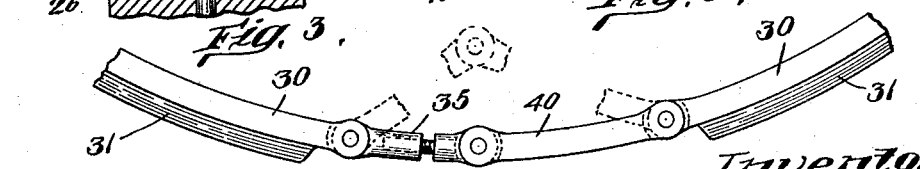

There is also provided an expansible rim 30, adapted for engagement with one side of the wheel, at the edge of the fixed rim, usually bearing against said rim, said ring having a projecting rib 31, made wedge-shaped to enter the recess between the lugs 29 and the fixed rim, thus to draw the demountable rim into its final position and to hold it in place on the fixed rim, by holding it against lateral relative movement with respect thereto in the direction toward the left Fig. 2. Said ring is made as an incomplete circle, so as to engage the fixed rim and the lugs 29 for the most part, and between its end-portions there is provided a toggle locking-device comprising two toggle-members or links 35, 40, pivotally connected together, said members being pivotally connected at their outer extremities to the corresponding ends of the incomplete ring. One of the toggle-members or links is preferably made adjustable longitudinally, as shown, whereby ample adjustment is provided. When placing the ring in position, the toggle is broken, as represented by dotted lines, Fig. 6, and when placed in position the toggle is straightened, and thereby moved into operative position, as shown in full-line Fig. 6. These toggle-elements are preferably curved longitudinally on an arc of a circle corresponding to the curvature of the rim, and may, if desired, be provided with wedge-shaped ribs on their outer edges corresponding with the rib on the ring, and adapted to enter the recess back of the lugs 29, or between said lugs and the edge of the fixed rim.

I claim:—

1. The combination with a wheel, of a fixed rim on the felly, a demountable rim adapted for engagement with said fixed rim having inwardly extended beveled lugs, and an expansible ring having a single wedge-shaped rib adapted to be radially expanded to engage all of said lugs to force said demountable rim into engagement with said fixed rim.

2. A detachable means for supporting wheel tires comprising a fixed rim on the felly of the wheel, having an outer inclined edge-portion and a recess in said edge portion, a demountable rim having a bevel-faced rib for engagement with said inclined portion, a projection on said bevel faced rib adapted to enter the said recess to hold said rims against relative rotative movement, a plurality of lugs arranged on the edge of the demountable rim and an expansible locking member having a continuous wedge-shaped rib adapted to be radially expanded into engagement with said lugs and lock the demountable rim in expanded position.

3. In combination with a wheel tire, means detachably supporting said wheel tire including a fixed rim on the felly having an inclined portion along its outer face at one edge, and having outwardly extended lugs along its outer face at its opposite edge to support the demountable rim at said place in elevated position, and a demountable rim having a bevel faced rib for engagement with the inclined portion of said fixed rim, and having adjacent said rib an inwardly extended flange to hold said demountable rim against the lateral movement in one direction, and having a series of inwardly extended lugs near its other side adapted to pass through the interdental spaces between the lugs on the fixed rim, and an expansible ring having an engaging portion at its edge, adapted to enter the space between the lugs on the demountable rim and the lugs on the fixed rim.

In testimony whereof, I affix my signature.

ANDREW C. DAM.